(12) United States Patent
Sudschajew

(10) Patent No.: US 10,859,020 B2
(45) Date of Patent: Dec. 8, 2020

(54) METHOD FOR REDUCING PARTICULATE EMISSIONS DURING A COLD START OF AN INTERNAL COMBUSTION ENGINE

(71) Applicant: VOLKSWAGEN AKTIENGESELLSCHAFT, Wolfsburg (DE)

(72) Inventor: David Sudschajew, Abbesbüttel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/414,008

(22) Filed: May 16, 2019

(65) Prior Publication Data
US 2019/0353114 A1 Nov. 21, 2019

(30) Foreign Application Priority Data
May 16, 2018 (DE) .................. 10 2018 111 738

(51) Int. Cl.
*F02D 41/06* (2006.01)
*F01N 3/035* (2006.01)
(Continued)

(52) U.S. Cl.
CPC .......... *F02D 41/064* (2013.01); *F01N 3/035* (2013.01); *F02D 41/40* (2013.01); *F02N 11/08* (2013.01);
(Continued)

(58) Field of Classification Search
CPC ................ F02D 41/064; F02D 41/068; F02D 2041/389; F02D 2200/021;
(Continued)

(56) References Cited

U.S. PATENT DOCUMENTS

| | | | |
|---|---|---|---|
| 3,646,917 A * | 3/1972 | Nagy .................... | F02D 41/061 123/491 |
| 5,752,488 A * | 5/1998 | Hattori .................. | F02D 41/061 123/179.16 |
| 6,360,531 B1 | 3/2002 | Wiemero et al. | |
| 9,032,927 B1 * | 5/2015 | Redon .................... | F02B 75/12 123/179.16 |

(Continued)

FOREIGN PATENT DOCUMENTS

| DE | 39 06 296 A1 | 8/1990 |
|---|---|---|
| DE | 101 31 937 A1 | 3/2002 |

(Continued)

OTHER PUBLICATIONS

Translation of DE 102016208177, Lormann, May 12, 2016.*

(Continued)

*Primary Examiner* — Jesse S Bogue
(74) *Attorney, Agent, or Firm* — Pearl Cohen Zedek Latzer Baratz LLP

(57) ABSTRACT

In a method for reducing particulate emissions of an internal combustion engine during a cold start of the internal combustion engine, the combustion chamber temperature and the ambient temperature are determined. A cold start condition is recognized when the combustion chamber temperature is below a first threshold temperature and the ambient temperature is below a second threshold temperature. In this case, the internal combustion engine is dragged by means of the starter, wherein air that is present in the combustion chambers is compressed and heated. This heat is discharged to the combustion chamber walls, which are likewise heated up. In this operating situation there is no fuel injection in the combustion chambers and no ignition, so that no combustion takes place in the combustion chambers and the internal combustion engine compresses solely fresh air. The combustion chambers heat up due to the compression work, thus achieving better evaporation of the fuel in the combustion chamber. An initially switched-off fuel injection into the (Continued)

combustion chambers is switched on when the combustion chamber walls of the combustion chambers have reached a sufficient temperature, so that the soot formation due to unburned fuel striking the cold combustion chamber walls is reduced.

9 Claims, 2 Drawing Sheets

(51) Int. Cl.
    *F02D 41/40*    (2006.01)
    *F02N 11/08*    (2006.01)
    *F02D 41/38*    (2006.01)

(52) U.S. Cl.
    CPC .... *F01N 2510/06* (2013.01); *F02D 2041/389* (2013.01); *F02D 2200/021* (2013.01); *F02N 2200/023* (2013.01)

(58) Field of Classification Search
    CPC ....... F02D 2200/0414; F02D 2200/101; F02D 35/025; F02D 41/0002; F02D 41/3011; F02D 41/40; F02D 43/04; F02N 2300/2011; F02N 11/08; F02N 19/02; F02N 2200/023; F02P 5/1506; F01N 2510/06; F01N 3/035
    See application file for complete search history.

(56) References Cited

U.S. PATENT DOCUMENTS

| | | |
|---|---|---|
| 2003/0221418 A1 | 12/2003 | Surnilla |
| 2011/0088661 A1 | 4/2011 | Scznomak et al. |
| 2015/0114339 A1* | 4/2015 | Sellnau ................. F02M 31/13 123/294 |
| 2015/0283990 A1* | 10/2015 | Ulrey .................... B60W 10/08 477/3 |
| 2017/0175657 A1* | 6/2017 | Fei ........................ F02D 41/064 |
| 2018/0171904 A1* | 6/2018 | Ulrey ..................... F02D 41/26 |

FOREIGN PATENT DOCUMENTS

| | | |
|---|---|---|
| DE | 103 22 963 A1 | 12/2003 |
| DE | 10 2010 048 355 A1 | 5/2011 |
| DE | 10 2010 034 443 A1 | 2/2012 |
| DE | 10 2012 022 153 A1 | 5/2014 |
| DE | 10 2015 103 991 A1 | 10/2015 |
| DE | 10 2016 208 177 A1 | 11/2017 |

OTHER PUBLICATIONS

Search report for German Patent Application No. 10 2018 111 738.8, dated Nov. 20, 2018.

Extended search report for European Patent Application No. EP 19 17 2348, dated Sep. 20, 2019.

* cited by examiner

METHOD FOR REDUCING PARTICULATE EMISSIONS DURING A COLD START OF AN INTERNAL COMBUSTION ENGINE

CROSS REFERENCE TO RELATED APPLICATION

This application claims priority from German Patent Application No. 10 2018 111 738.8, filed May 16, 2018, which is incorporated herein by refernce in its entirety.

FIELD OF THE INVENTION

The invention relates to a method for reducing particulate emissions of an internal combustion engine, in particular a gasoline engine, during a cold start of the internal combustion engine, and a control unit for carrying out such a method.

BACKGROUND OF THE INVENTION

The increasing stringency of exhaust emission regulations has placed high demands on automotive manufacturers, which are addressed by suitable measures to reduce uncontrolled engine emissions and appropriate exhaust aftertreatment. The EU6 legislation prescribes a particle count limit for gasoline engines, which in many cases requires use of a gasoline engine particle filter. Such soot particles arise in particular after a cold start of the internal combustion engine due to incomplete combustion, in combination with an overstoichiometric combustion air ratio after the cold start, cold cylinder walls, and the heterogeneous mixture distribution in the combustion chambers of the internal combustion engine. In contrast to the loading of a diesel particle filter, the soot loading of a gasoline engine particle filter takes place essentially as a function of the combustion chamber temperature, and decreases with increasing combustion chamber temperature. Thus, the cold start phase plays a crucial role in compliance with the regulatory particulate limits, with regard to the particle mass as well as the particle count. At cold outside temperatures, in particular at ambient temperatures below 0° C., particulate emissions are particularly high in a gasoline engine due to the low degree of mixture homogenization and evaporation of the fuel, as well as the starting enrichment. In addition, a cold start with an understoichiometric, rich combustion air ratio results in higher emissions of carbon monoxide (CO) and unburned hydrocarbons (HC), since conversion to carbon dioxide and water vapor is not yet possible due to the cold catalytic converter. During driving operation, for motor vehicles with a gasoline engine particle filter, this gasoline engine particle filter then becomes further loaded with soot. This gasoline engine particle filter must be continuously or periodically regenerated to prevent excessive exhaust back pressure. The increase in exhaust back pressure may result in increased fuel consumption by the internal combustion engine, power loss, and impaired running smoothness, even misfiring. Carrying out thermal oxidation of the soot, retained in the gasoline engine particle filter, with oxygen requires a sufficiently high temperature level together with the simultaneous presence of oxygen in the exhaust gas system of the gasoline engine. Since current gasoline engines are normally operated with a stoichiometric combustion air ratio ($\lambda=1$) without excess oxygen, additional measures are necessary. Examples of such measures include increasing the temperature by adjusting the ignition angle, temporarily adjusting the gasoline engine to lean conditions, blowing secondary air into the exhaust gas system, or a combination of these measures. Thus far, adjustment of the ignition angle in the retarded direction in combination with an adjustment of the gasoline engine to lean has been preferred, since this method does not require additional components, and is able to deliver a sufficient quantity of oxygen in most operating points of the gasoline engine. Whereas in a diesel engine, the soot loading of the particle filter takes place essentially continuously during operation, the gasoline engine emits soot particles primarily in a cold start phase of the internal combustion engine, with increased soot formation as the ambient temperature drops. In the spark ignition internal combustion engine, the highest proportion of uncontrolled soot emissions originates due to the cold combustion chamber walls and the resulting inadequate evaporation of the fuel, from a cold start phase at low ambient temperatures, in particular at ambient temperatures below 0° C.

For example, a reduction in the starting enrichment, the use of multiple ignition or multiple injection to avoid combustion chamber wall wetting, and improved mixture control are known for reducing the soot formation in the cold start phase of a spark ignition internal combustion engine. However, these measures are usually achievable only with a high level of effort, and therefore are generally costly. In addition, the option for an alternative ignition system such as laser ignition or corona ignition is known.

A device for reducing vehicular emissions and a method for reducing the cold start emissions of an internal combustion engine are known from DE 101 31 937 A1, in which the valve timing, the ignition angle, and the combustion air ratio are adjusted to improve the combustion temperature and the combustion efficiency in the cold start phase, and to reduce the cold start emissions.

In addition, switching off the cylinder of at least one combustion chamber, preferably at least two combustion chambers, in particular one-half of the combustion chambers present, in an internal combustion engine is known in order to conserve fuel in the event of a low engine load or a low partial load of the internal combustion engine.

A method for operating an internal combustion engine is known from DE 10 2012 022 153 A1, in which the switching off of cylinders of an internal combustion engine is utilized to increase the exhaust gas temperature of the internal combustion engine by operating the cylinders, which are not switched off, with an understoichiometric mixture, and at that location, exothermically reacting the unburned fuel of the understoichiometric mixture with the oxygen that is conveyed into the exhaust duct via the switched-off cylinders.

A method for reducing the exhaust gas emissions of a gasoline engine, using an exhaust aftertreatment device, is known from DE 39 06 296 A1, wherein the fresh air quickly undergoes intensive electrical heating before entering the combustion chamber of the engine. In the process, an electrical heat output of 1 kW or greater is introduced into the fresh air stream in order to improve the mixture formation and the ignition behavior of the fuel during a cold start.

However, a drawback of such an approach is that at cold outside temperatures, the performance of the vehicle battery also decreases greatly, and the friction of the engine components due to higher viscosity of the cold oil increases, so that a heavy load on the vehicle battery must be avoided specifically in such situations.

SUMMARY OF THE INVENTION

The object of the invention is to reduce the soot emissions in the cold start phase of an internal combustion engine and overcome the disadvantages known from the prior art.

According to the invention, this object is achieved by a method for reducing particulate emissions of an internal combustion engine during a cold start of the internal combustion engine, comprising the following steps:

determining a combustion chamber temperature of the internal combustion engine, and an ambient temperature, dragging the internal combustion engine by means of a starter when the combustion chamber temperature is below a first threshold temperature and the ambient temperature is below a second threshold temperature, wherein the air that is present in the combustion chambers is compressed and heated, wherein the heat is transmitted to the combustion chamber walls of the combustion chambers of the internal combustion engine, and the injection of fuel into the combustion chambers of the internal combustion engine is prevented in this operating situation as long as the combustion chamber temperature is below the first threshold temperature, and switching the injection of fuel into the preheated combustion chambers when a defined time interval has elapsed, a certain number of motor revolutions is achieved, or the combustion chamber has reached a defined minimum temperature.

In the method according to the invention, during a cold start in cold surroundings the internal combustion engine is initially operated as an "air pump," wherein no fuel is injected into the combustion chambers, so that combustion and associated soot formation are precluded. When the combustion chamber walls have appropriately heated up due to the compression of the air, the fuel injection is switched on, so that the evaporation of fuel is improved and the fuel in particular no longer strikes a cold combustion chamber wall. The starting operation may take place with less enrichment of fuel, and soot reduction may be achieved due to the warmer combustion chamber walls and the improved mixture homogenization.

Advantageous improvements and refinements of the method for reducing particulate emissions stated in the independent claim are possible as a result of the features set forth in the dependent claims.

In one preferred embodiment of the method, it is provided that when the fuel injection is prevented, the introduction of ignition sparks into the combustion chambers of the internal combustion engine is prevented at the same time. Since in the method according to the invention, initially no ignitable combustion air mixture is present in the combustion chambers, in this operating phase the introduction of ignition sparks may also be dispensed with. This reduces the energy consumption and increases the service life of the spark plugs.

In one advantageous embodiment of the method, it is provided that the switching off of the fuel injection as a function of the determined ambient temperature takes place for a defined time period, and fuel is injected into the combustion chambers of the internal combustion engine after this defined time period. The colder the ambient temperature and the colder the combustion chamber temperature, the longer the internal combustion engine is operated as an air pump to achieve an appropriate increase in the temperature of the combustion chamber walls. Due to the dependency of the time period on the determined ambient temperature, it may be ensured that the combustion chamber walls heat up sufficiently to reduce soot particle formation.

It is preferred when the second threshold temperature is less than or equal to 0° C. Test results have shown that the soot formation in the combustion chambers increases markedly when the internal combustion engine is cold and the ambient temperature is below 0° C. In this regard, a cold internal combustion engine is understood to mean an internal combustion engine in which there is only an insignificant difference between the temperature of the combustion chamber walls prior to starting, and the ambient temperature.

In a further improvement of the method, it is provided that the throttle valve in the intake duct of the internal combustion engine is completely open when the method is carried out. A preferably large quantity of fresh air can flow into the combustion chambers of the internal combustion engine as the result of opening the throttle valve. The peak pressure during compression of the fresh air may thus be increased, so that the combustion chambers heat up more quickly than with a throttled inflow of fresh air.

In one advantageous refinement of the method, it is provided that a fuel pump for supplying fuel to fuel injectors is driven when the fuel injection is switched off, in order to build up fuel pressure in the fuel supply line to the fuel injectors. Due to the pressure buildup, after the fuel injection is switched off the fuel may be injected into the combustion chambers at higher pressure, so that better atomization of the fuel, and accordingly less soot formation, may be achieved.

Furthermore, it is advantageously provided that after the fuel injection is switched on, as a function of the ambient temperature the injection pressure is increased compared to a similar operating point for which the fuel injection is not switched off. In addition to the preceding measures, increasing the injection pressure in the cold start phase also results in finer atomization of the fuel and formation of a more homogeneous combustion mixture in the combustion chambers. This reduces the soot emissions of the internal combustion engine.

According to the invention, a control unit for the internal combustion engine is proposed, the control unit being configured in such a way that a method according to the invention is carried out when a machine-readable program code is executed by the control unit. By use of a control unit according to the invention, a method according to the invention for reducing the cold start emissions, in particular particulate emissions, may be easily and cost-effectively carried out in an internal combustion engine having direct fuel injection. This approach may be implemented strictly by software, so that no additional hardware is necessary. The method may thus be implemented in an essentially cost-neutral manner in an internal combustion engine having direct fuel injection.

Also proposed according to the invention is a motor vehicle having an internal combustion engine with at least one combustion chamber, preferably at least three combustion chambers, a control unit, and an exhaust gas system in which at least one particle filter or a four-way catalytic converter is situated. The proposed method may be easily and cost-effectively implemented in diesel engines as well as gasoline engines, using a software program on the control unit of the internal combustion engine. However, since diesel engines emit soot essentially continuously, and emit soot even during normal operation of the internal combustion engine, in particular during heavy accelerations, the efficiency of this method is limited for a diesel engine. In principle, however, for all internal combustion engines the proposed method results in a reduction in the cold start emissions, in particular particulate emissions, during a cold start of the internal combustion engine.

In one preferred embodiment of the motor vehicle, it is provided that the internal combustion engine is a gasoline engine that is spark-ignited by means of spark plugs, and the at least one particle filter is a gasoline engine particle filter or a four-way catalytic converter. As mentioned at the outset, in a gasoline engine soot particles are emitted primarily in the cold start phase of the internal combustion engine. Therefore, the proposed method for reducing the cold start emissions is particularly advantageous for a gasoline engine, since the combustion chamber walls of the combustion chambers are first heated up before the fuel is injected into the combustion chambers. During this subsequent switching on of the fuel injection and the ignition, the fuel now strikes preheated combustion chamber walls, which facilitate evaporation of the fuel and reduce the particulate emissions. No additional components such as glow plugs are necessary for preheating the combustion chambers. In addition, the method according to the invention may be combined with further measures known from the prior art for reducing the cold start emissions in a spark ignition internal combustion engine, for example multiple ignition, increasing the injection pressure, multiple injection, or reducing the starting enrichment. A further reduction in the cold start emissions, in particular particulate emissions, is thus possible.

Further preferred embodiments of the invention result from the other features set forth in the subclaims.

Unless stated otherwise in the individual case, the various embodiments of the invention mentioned in the present patent application may advantageously be combined with one another.

BRIEF DESCRIPTION OF THE DRAWINGS

The invention is explained below in exemplary embodiments with reference to the associated drawings, which show the following.

DETAILED DESCRIPTION OF THE INVENTION

Figure 1:
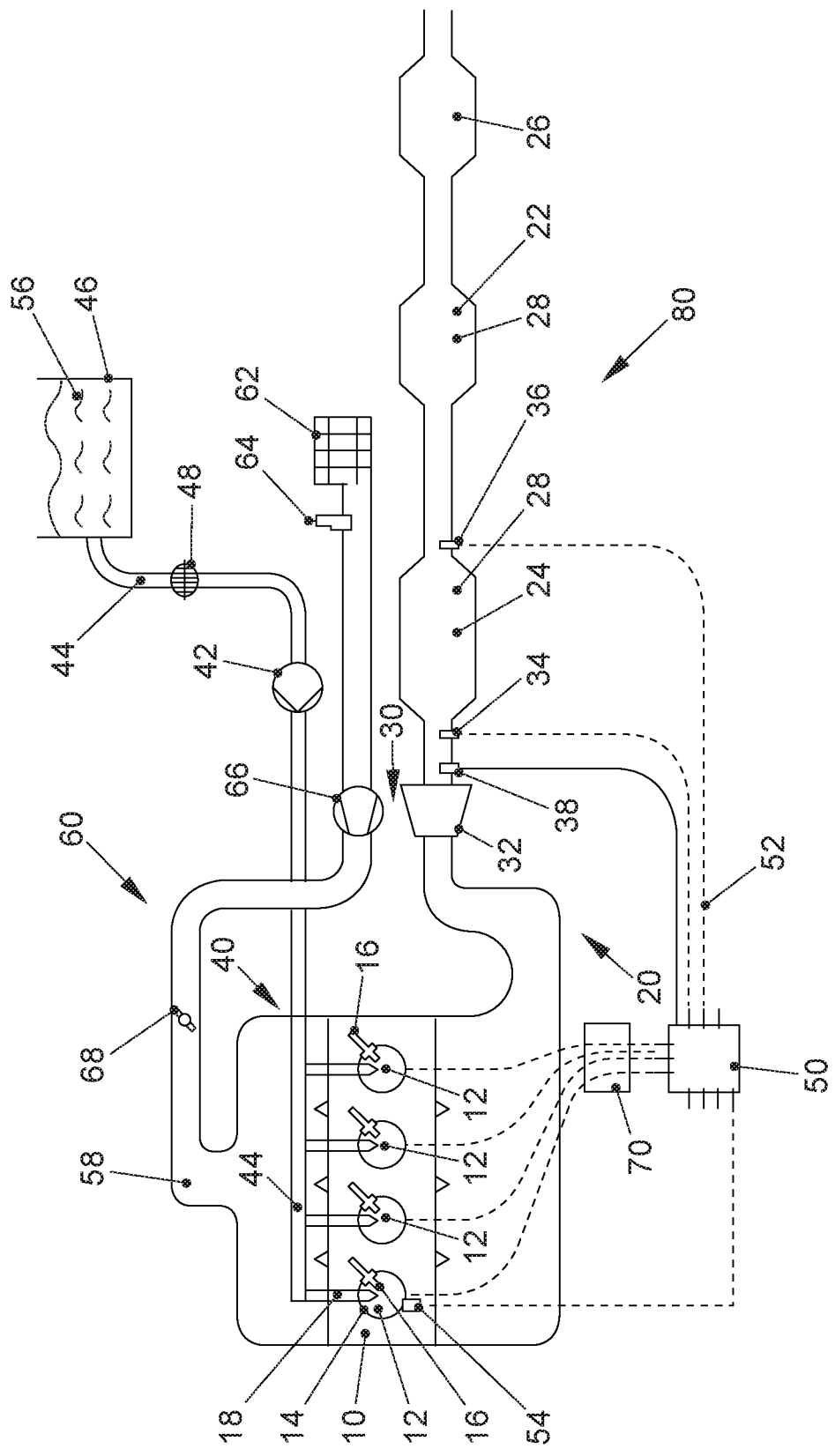
FIG. 1 shows an internal combustion engine having an air supply, a fuel injection system, an ignition system, and an exhaust gas system, in which a method according to the invention for reducing the cold start emissions may be carried out.

FIG. 1 shows a spark ignition internal combustion engine 10 for a motor vehicle 80, having an exhaust gas system 20 in which a three-way catalytic converter 24 close to the engine, a particle filter 22 downstream from the three-way catalytic converter 24 close to the engine, and further downstream, another three-way catalytic converter 26, are situated in the flow direction of the exhaust gas of the internal combustion engine 10 through the exhaust gas system. In one simplified embodiment, the second three-way catalytic converter 26 may be dispensed with. In addition to the three-way catalytic converter 24 and the particle filter particle filter 22, additional catalytic converters and exhaust aftertreatment devices, in particular a NOx storage catalytic converter, may be situated in the exhaust gas system. The particle filter 22 may have a coating with three-way catalytic activity and may be designed as a so-called four-way catalytic converter 28, wherein the particle filter 22 in this case combines the functions of the three-way catalytic converter 24 and the particle filter 22 in one component. The internal combustion engine 10 is supplied with fresh air via an air supply system 60. An air filter 62 and an air flow meter 64 are situated in an intake duct 58 of the internal combustion engine 10. The fresh air may be compressed by means of a compressor and/or an exhaust gas turbocharger 30, a turbine 32 being situated in the exhaust gas system 20 which drives a compressor 66 in the air supply system 60 of the internal combustion engine 10. The fresh air that is supplied to the combustion chambers 12 of the internal combustion engine 10 is compressed in this way. A throttle valve 68 for controlling the quantity of fresh air supplied to the combustion chambers 12 is situated in the intake tract 58. The internal combustion engine 10 also has a fuel supply in which fuel 56 from a fuel tank 46 is supplied to a fuel injection system 40 via a fuel line 44, by means of a fuel pump 42, and injected as needed into the intake tract 58 or into the combustion chambers 12 of the internal combustion engine 10. The fuel 56 is preferably injected through fuel injectors 18, situated at the combustion chambers 12, into the respective combustion chamber 12 of the internal combustion engine 10. A fuel filter 48 is provided in the fuel line 44, between the fuel tank 46 and the fuel pump 42, for removing contaminants from the fuel 56 and thus protecting the fuel pump 42 and the fuel injection system 40 from damage by contaminated fuel 56. The internal combustion engine 10 also has an ignition distributor via which spark plugs 16 at the combustion chambers 12 may be controlled, and in each case the spark plugs emit one or more ignition sparks into the combustion chamber 12. The combustion air mixture in the combustion chambers 12 may be ignited in this way. Lambda sensors 34, 36 via which the combustion air ratio A of the internal combustion engine 10 may be regulated are situated in the exhaust gas system 20 of the internal combustion engine 10, upstream from the three-way catalytic converter 24 and downstream from the three-way catalytic converter 24, in the flow direction of an exhaust gas of the internal combustion engine 10 through the exhaust gas system 20. For this purpose, the lambda sensors 34, 36, the fuel injection system 40, and the ignition distributor are connected to a control unit 50 of the internal combustion engine 10 via signal lines 52, by means of which the combustion air ratio A, the fuel quantity, and the ignition point at which the spark plugs 16 in each case emit an ignition pulse are controlled. It is also possible to provide a temperature sensor 38 in the exhaust gas system 20, via which an exhaust gas temperature TEG may be determined and used for controlling the internal combustion engine 10.

The task of the particle filter 22 or the four-way catalytic converter 28, which may replace the three-way catalytic converter 24 and the particle filter 22, is to remove particles from the exhaust gas. The particles are deposited in the filter and the exhaust gas is purified. The particle filter 22 or the four-way catalytic converter 28 is loaded with soot as a result of this deposition mechanism. Negative effects such as power loss, higher fuel consumption, or also misfiring may occur due to the loading. To avoid these negative effects, the particle filter 22 or the four-way catalytic converter 28 must be regenerated cyclically and/or as a function of the loading. While in a diesel engine the loading of a particle filter 22, 28 takes place quasi-continuously and is a problem in particular under heavy accelerations or full load, gasoline engines emit particles in particular during a cold start phase of the internal combustion engine 10. At low outside temperatures, in particular at outside temperatures below 0° C., in a gasoline engine particulate emissions are very high due to the low mixture homogenization and the low fuel evaporation and starting enrichment. The highest proportion of soot emissions originates due to the fact that evaporation of the fuel 56 is inadequate when the combustion chamber walls 14 of the combustion chambers 12 are cold. As a result of the high soot emissions in the cold start phase, the particle filter 22 or the four-way catalytic converter 28 quickly becomes loaded with soot, so that frequent regeneration of the particle filter 22 or of the four-way catalytic converter 28 is necessary. A regeneration of the particle filter 22 or of the four-way catalytic converter 28 is possible in particular due to an overstoichiometric operation of the internal combustion engine 10 or by the introduction of secondary air into the exhaust gas system 20. During overstoichiometric operation of the internal combustion engine 10, there is also an increase in the nitrogen oxides emissions, since they can no longer be converted into harmless exhaust gas components by one of the three-way catalytic converters 22, 26 or the four-way catalytic converter 28.

Figure 2:
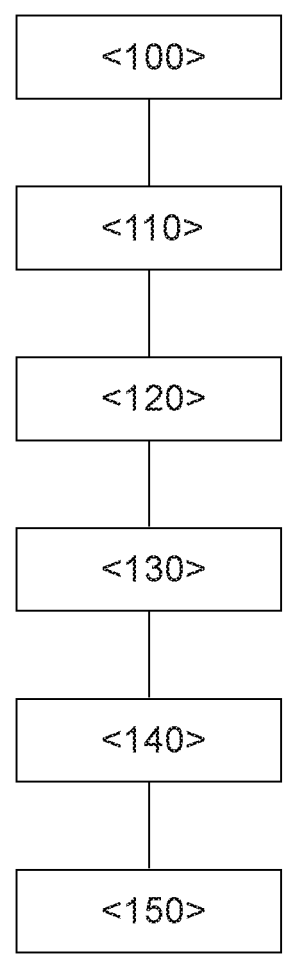
FIG. 2 shows a flow chart for carrying out a method according to the invention for reducing the cold start emissions of a spark ignition internal combustion engine.

FIG. 2 illustrates a flow chart of a method according to the invention for reducing particulate emissions during a cold start of the internal combustion engine 10. In a first method step <100>, it is checked whether the combustion chamber temperature $T_{BR}$ is below a first threshold temperature $T_{S1}$ and the ambient temperature $T_{UMG}$ is below a second threshold temperature $T_{S2}$. In particular, a temperature of 0° C. or lower is provided as the second threshold temperature $T_{S2}$. The internal combustion engine 10 is started in a second method step <110>, wherein at least the internal combustion engine 10 is dragged by means of a starter when a cold start is recognized. A cold start is recognized when the combustion chamber temperature $T_{BR}$ and the ambient temperature $T_{UMG}$ are below the respective threshold temperature $T_{S1}$, $T_{S2}$. As a result of dragging the internal combustion engine 10, the fresh air is compressed in the combustion chambers 12 and heated up in a method step <120>. The heat of the compressed air is hereby transmitted to the combustion chamber walls 14 of the combustion chambers 12, which likewise heat up. In this drag mode no fuel 56 is injected into the combustion chambers 12, so that no combustion occurs in this operating state. In the exemplary embodiment illustrated in FIG. 1, the internal combustion engine 10 is designed as a 4-cylinder in-line engine, wherein the fuel injection into the four combustion chambers 12 is prevented in the cold start phase. At the same time, in a method step <130>the fuel injection pump 42 is operated to build up fuel pressure. In addition, in a method step <140>the throttle valve 68 in the intake duct 58 is opened so that a preferably large quantity of fresh air may be conducted into the combustion chambers 12 and compressed at that location. When the combustion chamber walls have reached a defined minimum temperature $T_{min}$ or the internal combustion engine 10 has achieved a certain number of revolutions, the fuel injection and the ignition are activated in a method step <150>. Due to the preceding pressure buildup, the injection pressure of the fuel 56 that is injected into the combustion chambers 12 may be increased in order to achieve better atomization of the fuel 56 and thus form finer droplets, so that the risk of unburned liquid fuel 56 striking the cold combustion chamber wall 14 of the combustion chamber 12 is reduced.

In summary, by use of a method according to the invention the soot emissions in the cold start phase of an internal combustion engine 10 may be easily and cost-effectively reduced without the need for additional components or other changes to the internal combustion engine 10.

LIST OF REFERENCE NUMERALS

10 internal combustion engine
12 combustion chamber
14 combustion chamber wall
16 spark plug
18 fuel injector
20 exhaust gas system
22 particle filter
24 first three-way catalytic converter
26 second three-way catalytic converter
28 four-way catalytic converter
30 exhaust gas turbocharger
32 turbine
34 first lambda sensor
36 second lambda sensor
38 temperature sensor
40 fuel injection system
42 fuel pump
44 fuel line
46 fuel tank
48 fuel filter
50 control unit
52 signal line
54 temperature sensor
56 fuel
58 intake line
60 air supply system
62 air filter
64 air flow meter
66 compressor
68 throttle valve
80 motor vehicle
λE combustion air ratio
T temperature
$T_{min}$ minimum temperature
$T_S$ threshold temperature
$T_{UMG}$ ambient temperature

The invention claimed is:

1. A method for reducing particulate emissions of an internal combustion engine during a cold start of the internal combustion engine, comprising the following steps:
    determining a combustion chamber temperature of the internal combustion engine, and an ambient temperature,
    dragging the internal combustion engine by means of a starter when the combustion chamber temperature is below a first threshold temperature and the ambient temperature is below a second threshold temperature,
        wherein the air that is present in the combustion chambers is compressed and heated,
        wherein the heat is transmitted to the combustion chamber walls of the combustion chambers of the internal combustion engine, and
        wherein the injection of fuel into the combustion chambers of the internal combustion engine is prevented in this operating situation as long as the combustion chamber temperature is below the first threshold temperature, and
    switching the injection of fuel into the preheated combustion chambers when a defined time interval has elapsed, a certain number of motor revolutions is achieved, or the combustion chamber has reached a defined minimum temperature,
    wherein a throttle valve in the intake duct of the internal combustion engine is completely open when the method is carried out.

2. The method according to claim 1, wherein, when the fuel injection is prevented, the introduction of ignition sparks into the combustion chambers of the internal combustion engine is prevented at the same time.

3. The method according to claim 1, wherein, the switching off of the fuel injection as a function of the determined ambient temperature takes place for a defined time period, and fuel is injected into the combustion chambers of the internal combustion engine (after this defined time period.

4. The method according to claim 1, wherein the second threshold temperature is less than or equal to 0° C.

5. The method according to claim 1, wherein a fuel pump for supplying fuel to fuel injectors is driven when the fuel injection is switched off, in order to build up fuel pressure in the fuel supply line to the fuel injectors.

6. The method according to claim 1, wherein, after the fuel injection is switched on, as a function of the ambient temperature the injection pressure is increased compared to a similar operating point for which the fuel injection is not switched on.

7. A control unit for an internal combustion engine, wherein the control unit is configured in such a way that a method according to claim 1 is carried out when a machine-readable program code is executed by the control unit.

8. A motor vehicle having an internal combustion engine with at least one combustion chamber, a control unit according to claim 7, and an exhaust gas system in which at least one particle filter or a four-way catalytic converter is situated.

9. The motor vehicle according to claim 8, wherein the internal combustion engine is a spark ignition gasoline engine, and the at least one particle filter is a gasoline engine particle filter or a four-way catalytic converter.

\* \* \* \* \*